Patented May 30, 1944

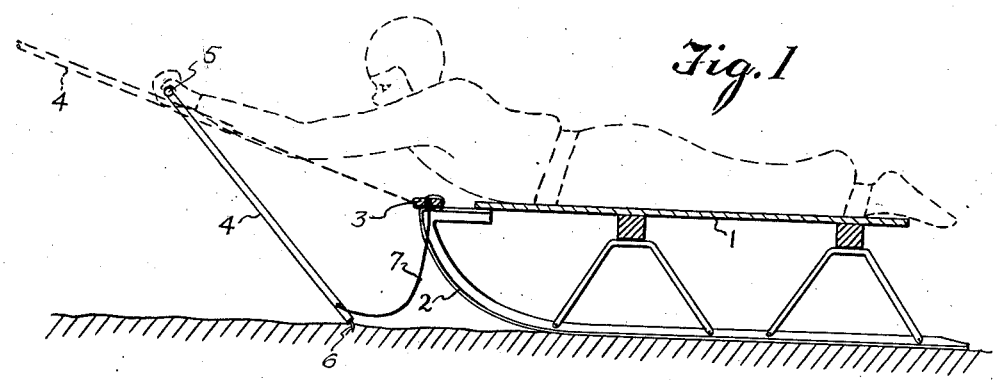
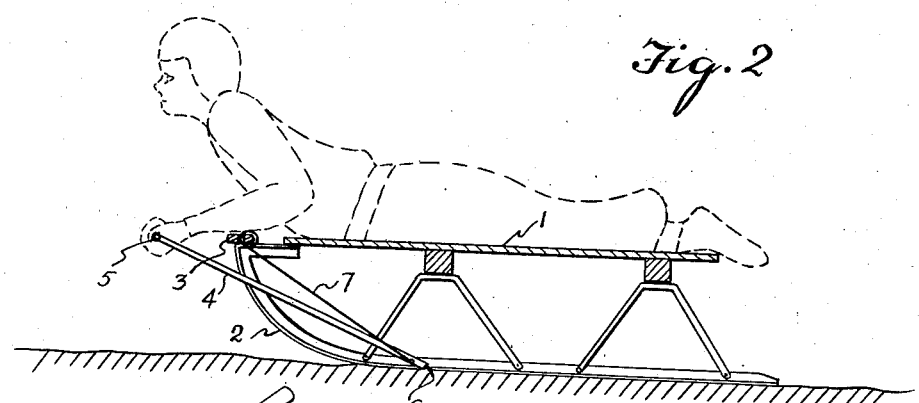
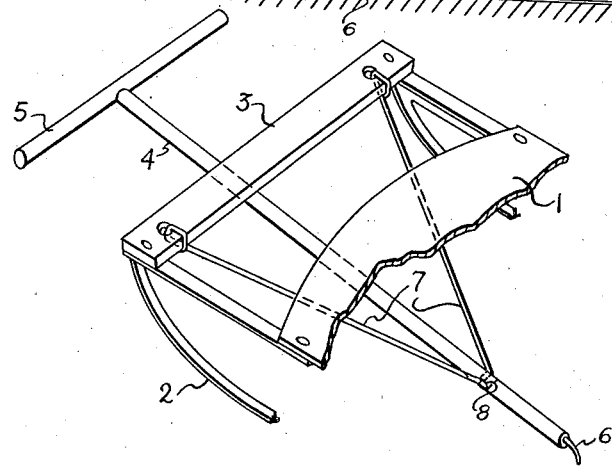

2,350,036

UNITED STATES PATENT OFFICE 2,350,036

SLED PUSHING AND PULLING MEANS

Emerick Hodaly, Detroit, Mich.

Application October 7, 1942, Serial No. 461,179

5 Claims. (Cl. 280—12.11)

This invention relates to sleds and particularly the propulsion of sleds.

Various devices have been made public involving use of push poles to enable a child occupying a sled to propel the same along a surface of snow or ice. Such devices, however, have involved either the use of a plurality of push poles or complexities undesirable in a recreational device intended for small children.

An object of the invention is to provide a push pole for effecting sled propulsion, equipped with handles and suited to be operated by a child recumbent on the sled, the sled being adapted to advance above the pole and the latter being so flexibly connected to the sled that the hands of a child grasping said handles are safeguarded against impact of the front end of the sled.

Another object is to so equip a sled-propelling push pole with handles and to so flexibly connect said pole to the sled that the pole in conjunction with the flexible connection conveniently serves for pulling the sled.

These and various other objects are attained by the construction hereinafter described and illustrated in the accompanying drawing, wherein:

Fig. 1 is a longitudinal vertical sectional view of a sled equipped with the improved propulsion means, showing an initial position of the push pole.

Fig. 2 is a similar view showing location of the push pole at completion of a propulsive impulse.

Fig. 3 is a perspective view of the push pole showing its flexible connection to a sled.

In these views, the reference character 1 designates the platform and 2 the runners of a sled such as is now popular with children. The forward ends of the runners are connected, at the platform level by a cross bar 3 and the platform is preferably rearwardly spaced from such cross bar.

For propelling the described sled, I provide a push pole 4 adapted to be thrust by the sled occupant against the surface supporting the sled to propel the latter. The upper end of this pole rigidly carries a handle-forming cross bar 5 projecting at opposite sides of the pole to be gripped by the sled occupant. The lower end of the pole carries a metal shoe 6 tending to prevent slipping of the pole when exerting a thrust against a sled-supporting surface. It is preferred to form said shoe as a heavy wire prong having a sharpened free end and projecting from the pole at a downward curvature.

It is desirable that the push pole be operated in the medial longitudinal vertical plane of the sled or approximately in said plane to avoid any undesired tendency to laterally vary the sled direction, and it is therefore necessary that the pole underlie the platform, at least to a considerable extent. As is evident from Fig. 2, the handles lie in the path of advance of the sled as a propulsive thrust is being completed and there would frequently be a forceful encounter between the front end of the sled and the hands of the occupant, if some safeguard were not provided. Even if the sled is not being rapidly advanced, the hands of the sled occupant are likely to be bruised or cut, in absence of a safeguard, since the occupant is exerting a rearward thrust on the push pole and the latter due to its acute inclination at completion of a thrust, may suddenly slip on the snow or ice so that the muscular effort applied to the pole results in forceful impact of the occupant's hands with the sled.

As a safeguard against injury to the hands of the occupant, a rope 7 or other flexible non-elastic element is so used as a tie connection between the push pole and forward end of the sled as to limit rearward movement of the pole relative to the sled and thus assure a safe spacing of the handles 5 from the cross bar 3 when a propulsive stroke is completed. It is preferred to attach the extremities of the rope 7 to the end portions of the cross bar 3 and to engage mid portion of the rope with the pole 4 by freely extending the rope through a diametrical opening 8 in the pole. Thus as the rope assumes an approximate V shape, as it will under stress, the thrust exerted on the pole tends to automatically dispose the pole at the apex of the V formed by the rope and thus in the central longitudinal medial plane of the sled. This assists in avoiding any undesired lateral component to the exerted thrust, and is also of value in transmitting a pull centrally to the sled.

It is to be noted that the described propulsive means can readily be used for steering a sled as well as propelling same, so that a material economy is effected by elimination of the usual steering provision.

It is evident also that the push pole in conjunction with its flexible connection to the sled provides a convenient means for pulling the sled, as is indicated in dash lines in Fig. 1.

The flexible connection, as applied is further useful in that it automatically effects a disengagement of the push pole from the surface against which it has been exerting thrust, when a propulsive impulse is completed.

The invention is presented as including all such changes and modifications as come within the scope of the following claims.

What I claim is:

1. The combination with a vehicle, of a push pole having a metal shoe at one end for transmitting thrust to a surface on which the vehicle travels and equipped with oppositely projecting handles substantially at its other end, the vehicle including a platform spaced above said surface to receive an occupant of the vehicle, said handles being engageable by the hands of such occupant, and the platform being adapted to advance above the push pole as the latter is thrust rearwardly against said surface, and an elongated, flexible, non-elastic tie connection to the front portion of the vehicle from the lower portion of the push pole, limiting the extent to which the pole may engage beneath the platform and thus protecting the hands of the occupant from the advancing vehicle.

2. The combination as set forth in claim 1, said shoe being downwardly curved and reduced in cross section toward its free end.

3. The combination with a sled and a push pole for propelling the sled, of an elongated, flexible, non-elastic element having its ends attached to the front of the sled adjacent to the sides of the sled and having its mid portion attached to the lower portion of the push pole, said pole having a forward end equipped with oppositely projecting handles, for use by an occupant in pulling the sled and alternatively forming grips whereby the sled may be pulled, said flexible element limiting the rearward thrust applied to the pole and thereby preventing an unduly close approach of the sled to the handles during propulsive use of the pole and further serving to transmit to the sled a pull exerted on the push pole.

4. The combination as set forth in claim 3, said flexible element being freely slidable transversely of the pole at its point of attachment to the pole.

5. The combination with a vehicle, of a push pole having a metal shoe at one end for transmitting thrust to a surface on which the vehicle travels and equipped with oppositely projecting handles substantially at its other end, the vehicle including a platform spaced above said surface to receive an occupant of the vehicle, said handles being engageable by the hands of such occupant, and the platform being adapted to advance above the push pole as the latter is thrust rearwardly against said surface, and an elongated, flexible, non-elastic tie connection to the front portion of the vehicle from the lower portion of the push pole, limiting the extent to which the pole may engage beneath the platform and thus protecting the hands of the occupant from the advancing vehicle, said connection freely extending through an opening afforded by the pole and having end portions secured to the front portion of the vehicle and equally spaced from the medial vertical longitudinal plane of the vehicle.

EMERICK HODALY.